United States Patent
Ibukuro

(10) Patent No.: US 7,095,961 B2
(45) Date of Patent: Aug. 22, 2006

(54) OPTICAL COMMUNICATION SYSTEM AND OPTICAL RECEIVER

(75) Inventor: Sadao Ibukuro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 565 days.

(21) Appl. No.: 09/949,087

(22) Filed: Sep. 10, 2001

(65) Prior Publication Data

US 2002/0048069 A1 Apr. 25, 2002

(30) Foreign Application Priority Data

Sep. 19, 2000 (JP) .......................................... 2000-284254
Jul. 11, 2001 (JP) .......................................... 2001-211121

(51) Int. Cl.
*H04B 10/00* (2006.01)

(52) U.S. Cl. ........................ 398/155; 398/140; 398/160; 398/210; 398/91

(58) Field of Classification Search ................. 398/140, 398/155, 158–159, 160, 183, 209–210, 91
See application file for complete search history.

(56) References Cited

U.S. PATENT DOCUMENTS

| | | | |
|---|---|---|---|
| 4,257,125 A | 3/1981 | Theall, Jr. .................... | 398/209 |
| 4,703,474 A * | 10/1987 | Foschini et al. ............. | 370/441 |
| RE34,679 E * | 8/1994 | Ritzenthaler et al. ......... | 73/317 |
| 5,335,109 A | 8/1994 | Heidemann ............ | 359/341.41 |
| 5,444,561 A * | 8/1995 | Kaminishi ................... | 398/155 |
| 5,854,704 A | 12/1998 | Grandpierre ................ | 398/202 |
| 6,057,951 A | 5/2000 | Sugawara .................... | 398/209 |
| 6,583,909 B1 * | 6/2003 | Wada .......................... | 398/177 |
| 2004/0175810 A1 * | 9/2004 | Sugaya ......................... | 398/85 |

FOREIGN PATENT DOCUMENTS

| | | |
|---|---|---|
| JP | SHO 52-079860 | 7/1977 |
| JP | SHO 56-093491 | 7/1981 |
| JP | SHO 61-118050 | 6/1986 |

OTHER PUBLICATIONS

Suzuki et al., "Dynamic Gain Control by Maximum Signal Power Channel in Optical Linear Repeaters for WDM Photonic Transport Networks", IEEE Photonics Technology Letters, vol. 10, No. 5, May 1998. pp. 734–736.*

* cited by examiner

*Primary Examiner*—Kinfe-Michael Negash
(74) *Attorney, Agent, or Firm*—Staas & Halsey LLP

(57) ABSTRACT

An optical transmitter transmits a data signal developing a specific spectrum at a predetermined frequency, while an optical receiver detects amplitude information on the spectrum included in the data signal to control the received data signal to a constant amplitude on the basis of the detected amplitude information. This can provide an optical communication system and an optical receiver capable of functioning well even if the optical S/N is in a poor condition.

40 Claims, 8 Drawing Sheets

FREQUENCY SPECTRUM OF RZ SIGNAL

FREQUENCY SPECTRUM OF 3.2 NRZ SIGNAL

FREQUENCY SPECTRUM OF NRZ SIGNAL AM-MODULATED

S/N = 21.5 DB (ERROR RATE $10^{-9}$)

S/N = 17.5 DB (ERROR RATE $10^{-4}$)

S/N = 8 DB (ERROR RATE $10^{-1}$)

OPTICAL COMMUNICATION SYSTEM AND OPTICAL RECEIVER

BACKGROUND OF THE INVENTION (1) Field of the Invention

The present invention relates to an optical communication system and an optical receiver.

(2) Description of Related Art

In the recent years, the employment of a large-scale integrated circuit (LSI) has permitted an error correction code to be used as a transmission code. At present, an LSI capable of correcting and reducing an error rate of $2 \times 10^{-4}$ up to an error rate of approximately $10^{-15}$ has been put to practical use. And not only that, an LSI provided with an error correction code for making correction from $1 \times 10^{-2}$ to $10^{-15}$ has been in development.

Naturally, in the case of the employment of such a high correction capability code, an optical receiver would be required to operate normally in poor S/N conditions causing an error rate of $1 \times 10^{-2}$.

So far, the optical receiver has conducted an operation to make up an input to an identification unit to a constant amplitude for normal identification. As this approach, there has been employed a structural example in which a peak value of an equalized waveform signal after amplification is detected to give feedback (see FIG. 6) or a structural example in which an optical output power is made constant by an optical amplifier (see FIG. 7).

In FIG. 6, reference numeral 1 represents a light-receiving device (PD: PhotoDiode), numeral 2 represents a gain variable type preamplifier [AGC (Automatic Gain Controlled) amplifier], numeral 3 represents a low-pass filter (LPF), numeral 4 designates a band-pass filter (BPF), numeral 5 designates a differential amplifier, numeral 6 designates a flip-flop circuit (FF), numeral 7 depicts a peak value detecting circuit, numeral 8 depicts a limiter amplifier, numeral 9 depicts a signal identifying section, numeral 10 denotes a buffer amplifier, and numeral 18 denotes a clock extracting circuit.

In the optical receiver shown in FIG. 6, a PD 1 comprising a PIN photodiode or an avalanche photodiode receives light from an optical transmission line, and the preamplifier 2 amplifies the output of the PD 1. The output of the preamplifier 2 is inputted to the low-pass filter 2 and further to band-pass filter 4. The low-pass filter 3 is a filter having 3-dB down band corresponding to 0.7 to 0.8 of the bit rate of a received signal. The output of the low-pass filter 3 is inputted to the differential amplifier 5 and further to the peak value detecting circuit 7.

The peak value detecting circuit 7 is for detecting a peak value of a signal (received data signal) inputted to the differential amplifier 5 of the signal identifying section 9 and adjusting the gain of the preamplifier 2 to make constant the signal level inputted to the signal identifying section 9. The differential amplifier 5 of the signal identifying section 9 is for shaping a signal waveform in its amplitude direction by applying a value minimizing the error rate as a reference voltage Vref.

The band-pass filter 4 of the clock extracting circuit 18 is a filter for clock extraction, which detects a frequency (clock component) corresponding to the bit rate of a data signal. In this connection, the clock extracting circuit 18 shown in FIG. 6 has an arrangement for when the signal to be sent from the optical transmission line is an RZ (Return to Zero) signal. In the case of an NRZ (Non-Return to Zero), since a clock component does not exist in the signal spectrum unlike the RZ signal, there is a need to place a differentiating circuit for detecting an edge of a signal and a rectifying circuit for rectifying the output of the differentiating circuit in the former stage of the band-pass filter 4 to generate a clock for signal identification.

The output of the band-pass filter 4 is inputted to the limiter amplifier 8, and the limiter amplifier 8 cuts off both a peak level and bottom level of the output of the band-pass filter 4 and amplifies the received signal so that its upper limit and its lower limit assume predetermined values, respectively, for clock production. The clock thus shaped in the limiter amplifier 8 is inputted to the flip-flop circuit 6 of the signal identifying section 9. The flip-flop circuit 6 punches the output of the differential amplifier 5 with the output of the limiter amplifier 8 for outputting data subjected to signal identification. The buffer amplifier 10 is for setting up the circuit isolation.

On the other hand, in a configuration shown in FIG. 7, an optical amplifier 11, such as an EDF (Erbium Doped Fiber) amplifier, is provided at the final stage of an optical transmission line. In the FIG. 7 configuration, the same parts as those in FIG. 6 are marked with the same reference numerals. This optical amplifier 11 is designed to implement constant output control so that the signal power to be inputted to the PD 1 is made constant at all times.

Accordingly, a preamplifier 2' at the latter stage is required to perform simple amplification only, and this eliminates the need for the feedback control based on the received signal peak value detection in the FIG. 6 configuration.

Meanwhile, the received waveform in the above-mentioned optical receiver varies, for example, as shown in FIGS. 8A to 8C according to optical S/N. FIG. 8A shows a received waveform (eye pattern) in a case in which the SIN is at 8 dB (error rate=$1 \times 10^{-1}$), FIG. 8B shows a received waveform in a case in which the SIN is at 17.5 dB (error rate=$1 \times 10^{-4}$), and FIG. 8C shows a received waveform in a case in which the S/N is at 21.5 dB (error rate=$1 \times 10^{-9}$).

For example, in the poor optical S/N condition shown in FIG. 8A, in an optical receiver with the configuration shown in FIG. 6, the peak value detecting circuit 7 detects a peak value of a noise instead of a peak value of the intended received signal (data signal), and the amplitude of the received signal (data signal) inputted to the signal identifying section 9 becomes lower than the proper amplitude. For this reason, the signal identification indeterminate factors increase so that the actual error rate is impaired as compared with the error rate based on the optical S/N. Moreover, since the amplitude inputted to the clock extracting circuit 18 decreases, it tends to be out of the dynamic range of the clock extracting circuit 18.

In the poorer optical S/N condition, the ASE (Amplified Spontaneous Emission) light increases, which decreases the optical signal component with respect to the entire light. With this fact, in the case of the FIG. 7 configuration of the optical receiver which implements the constant output control on the entire light in the optical amplifier 11, similarly, the amplitude of the received signal to be inputted to the signal identifying section 9 becomes lower and the amplitude to be inputted to the clock extracting circuit 18 also becomes lower, which creates the same problem as that of the optical receiver with the configuration shown in FIG. 6.

In addition, although the error correction code is capable of correcting an error of a data signal, it is helpless against a case in which a clock signal falls into a malfunctioning condition. Although simple clock extracting circuits using a PLL circuit have frequently been put to use, if the optical S/N is in a poor condition, since a large noise is introduced into a phase comparator constituting the PLL circuit, the phase jump of the clock occurs to cause the out-of-synchronization, thereby producing huge burst errors.

For these reasons, the conventional optical receivers shown in FIGS. 6 and 7 do not function normally when a received signal is in a low S/N condition.

SUMMARY OF THE INVENTION

The present invention has been developed with a view to eliminating these problems, and it is therefore an object of the invention to provide an optical communication system and an optical receiver, capable of functioning excellently even when a received signal is in a poor S/N condition.

For this purpose, according to the present invention, when a signal amplitude is controlled on an optical receiver side, amplitude information on a specific spectrum (frequency component) involved in a data signal is detected instead of extraction of a peak of the data signal to implement the amplitude control on the data signal on the basis of the amplitude information, which allows the data signal to be amplitude-controlled without being affected by S/N.

That is, in accordance with the present invention, there is provided an optical communication system comprising an optical transmitter for transmitting a data signal developing a specific spectrum at a predetermined frequency, and an optical receiver for detecting the amplitude information on the spectrum included in the data signal transmitted from the optical transmitter to control the data signal to a constant amplitude on the basis of the amplitude information.

Thus, according to the present invention, a data signal producing a specific spectrum is transmitted at a predetermined frequency by a transmission side while the spectrum is detected on the receive side to implement control to keep the amplitude of the received data signal constant; therefore, it is possible to realize an optical communication system and an optical receiver capable of functioning excellently even if the optical S/N is in an extremely poor condition.

In this configuration, it is preferable that the optical receiver is composed of a signal identifying section for identifying the data signal, amplitude adjusting means capable of adjusting an amplitude of the data signal inputted to the signal identifying section, and control means for detecting the amplitude information on the spectrum from the data signal to control the amplitude adjusting means on the basis of the amplitude information so that the amplitude of the data signal inputted to the signal identifying section becomes constant.

In addition, it is also appropriate that the amplitude adjusting means is constructed as an optical amplifier capable of, when receiving the data signal in the form of an optical signal, adjusting the amplification degree of the optical signal, while the control means is designed to control the amplitude of the data signal inputted to the signal identifying section by controlling the amplification degree of the optical amplifier.

Still additionally, it is also appropriate that, for developing the spectrum at the predetermined frequency, an RZ (Return to Zero) signal is used as the data signal, or that a transmission optical signal is amplitude-modulated.

Moreover, it is also appropriate that the control means of the optical receiver is composed of a first clock extracting circuit including a first filter for extracting a frequency component of the spectrum from the data signal and a clock generating section for shaping the waveform of the output of the first filer to generate a clock signal for identification of the data signal in the signal identifying section, and a first amplitude detecting circuit for detecting amplitude information on the predetermined frequency to output a signal corresponding to the amplitude information as a control signal for the amplitude adjusting means.

Still moreover, it is also appropriate that the control means is composed of a second filter for extracting the frequency component of the spectrum from the data signal and a second amplitude detecting circuit for detecting amplitude information on the frequency component of the spectrum extracted by the second filter to output a signal corresponding to the amplitude information as a control signal for the amplitude adjusting means.

In this case, it is also appropriate that the optical receiver further comprises a differentiating/rectification circuit composed of a differentiating circuit for detecting an edge of the data signal and a rectifying circuit for rectifying the output of the differentiating circuit, and a second clock extracting circuit including a third filter for extracting a clock signal component for identification of the data signal in the signal identifying section from the output of the differentiating/rectifying circuit.

In this case, preferably, the Q valves of the first filter and the third filter are set at 300 or more.

DESCRIPTION OF THE PREFERRED EMBODIMENTS

Embodiments of the present invention will be described hereinbelow with reference to the drawings.

(A) Description of First Embodiment

Figure 1:
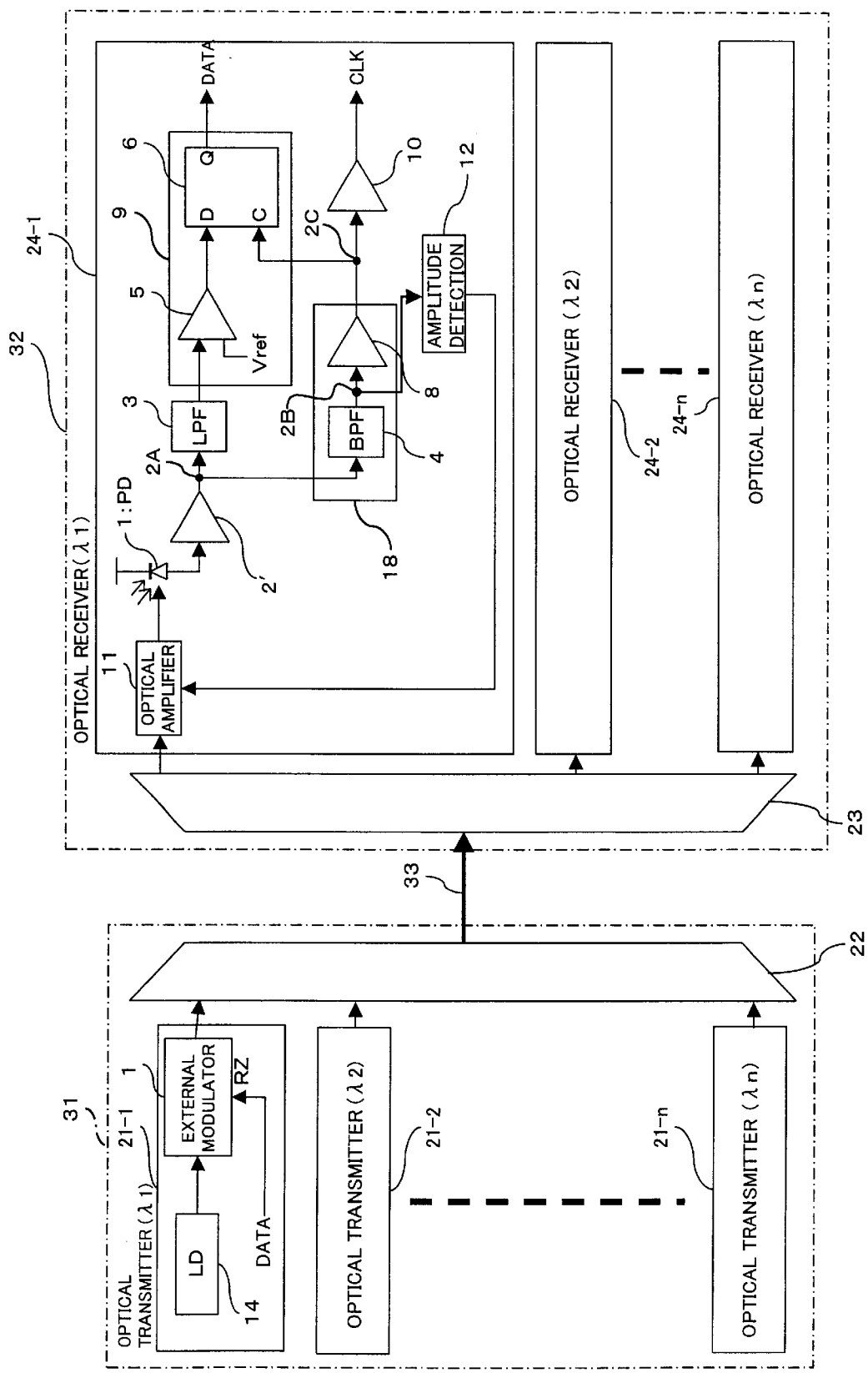
FIG. 1 is a block diagram showing a configuration of an essential part of an optical communication (transmission) system according to a first embodiment of the present invention.

FIG. 1 is a block diagram showing a configuration of an essential part of an optical communication (transmission) system according to a first embodiment of the present invention. In FIG. 1, this optical transmission system is made up of an optical transmitting apparatus 31 including a plurality of optical transmitters 21-1 to 21-n [n corresponds to the number of wavelengths (channels) equal to or more than two] and a wavelength multiplexing section 22, an optical receiving apparatus 32 including a wavelength demultiplexing section 23 and a plurality of optical receivers 24-1 to 24-n, and an optical transmission line 33 using an optical fiber [for example, Non-zero-DSF (Dispersion Shifted Fiber)].

Figure 6:
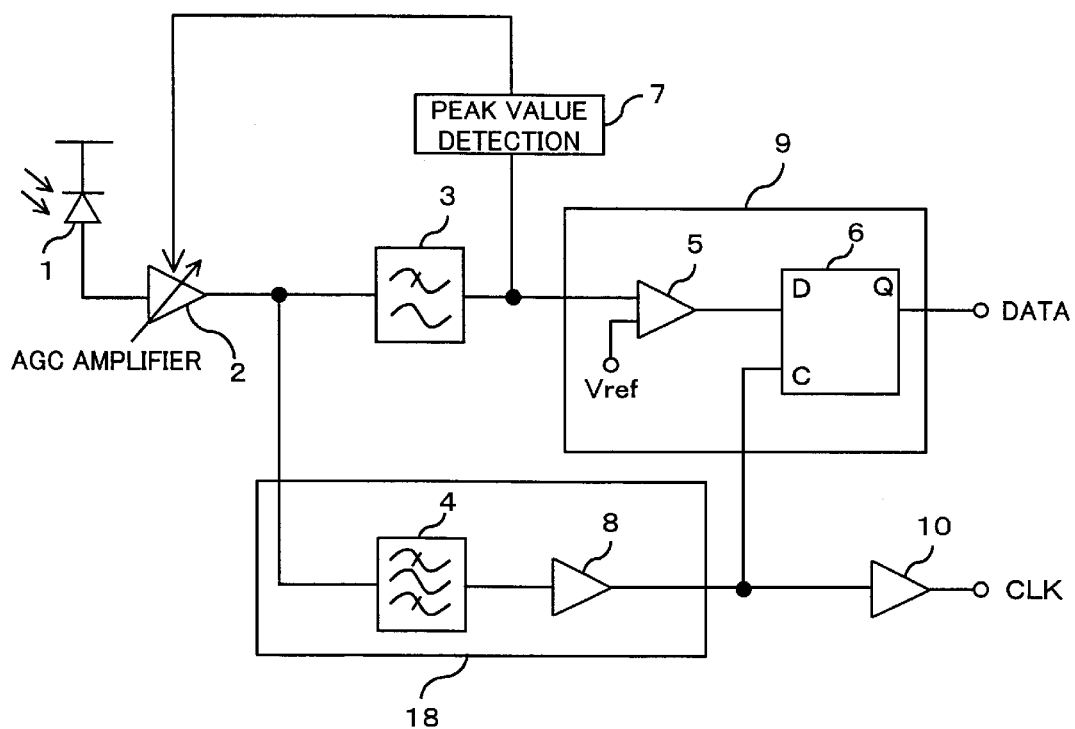
FIG. 6 is a block diagram showing an optical receiver with a conventional configuration.
Figure 7:
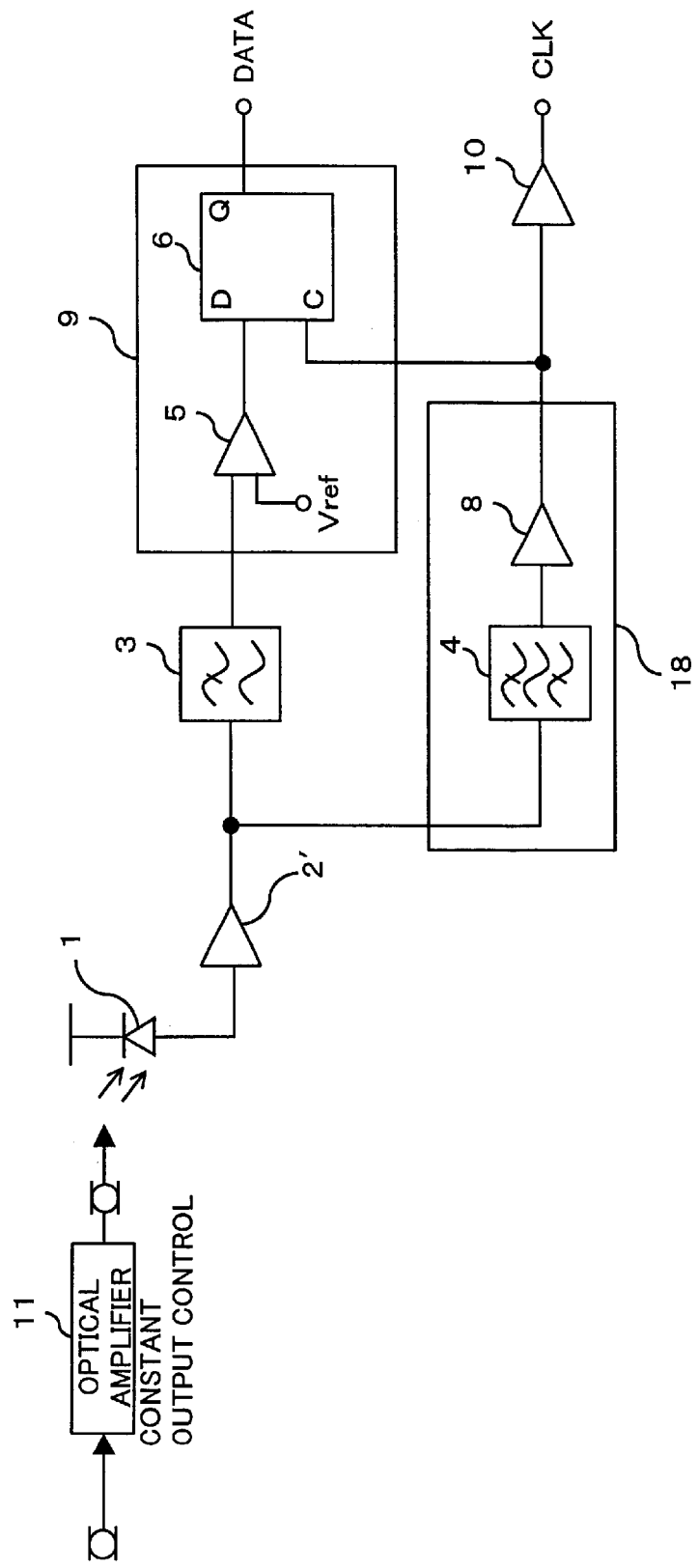
FIG. 7 is a block diagram showing an optical receiver with another conventional configuration.

Although the internal configuration of each of the optical transmitters 21-2 to 21-n is omitted from the illustration, it is the same as the internal configuration of the optical transmitter 21-1. Similarly, each of the optical receivers 24-2 to 24-n has the same internal configuration as that of the optical receiver 24-1. In addition, in FIG. 1, the parts marked with the same reference numerals as those in FIGS. 6 and 7 are the same as or similar to those mentioned above with reference to FIGS. 6 and 7.

In the optical transmitting apparatus 31, each of the optical transmitters 21-i (i=1 to n) is for generating and transmitting an optical signal with a predetermined wavelength λi, and for example, the essential part thereof is composed of a laser diode (LD) 14 serving as a light source for emitting light with a predetermined wavelength and an external modulator 15 such as a Mach-Zehnder type modulator as shown in FIG. 1.

Figure 8C:
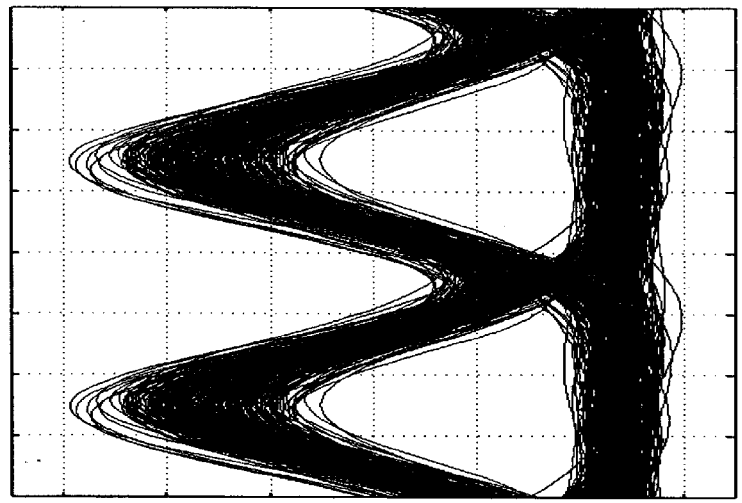
FIGS. 8A to 8C are illustrations of received waveforms (eye patterns) appearing according to optical S/N.
Figure 8B:
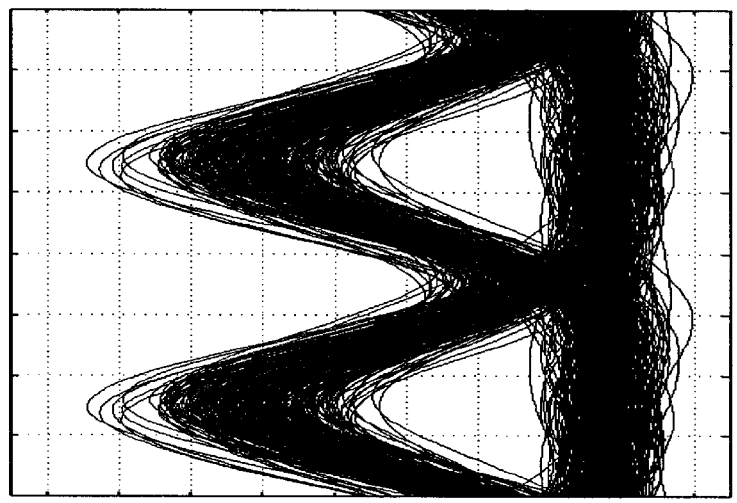
Figure 8A:
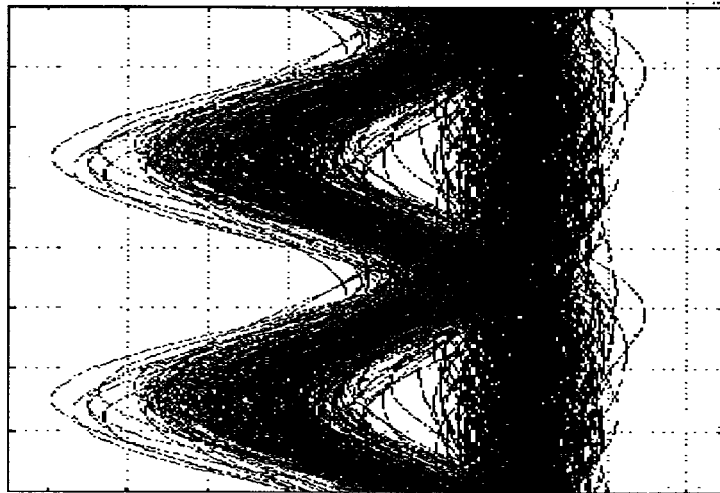

The problem of the conventional optical receivers mentioned above with reference to FIGS. 6 and 7 originates from that a poor-S/N signal as shown in FIG. 8A is directly used for the detection of a signal component in a case in which regeneration of a received signal is made through the use of an error correction code for correction from a $1 \times 10^{-2}$ error rate to a $10^{-15}$ error rate. For eliminating this, there is a need to previously transmit a signal which is unaffected by a noise and subjected to attenuation by the optical transmission line 33 in proportion to a transmitted signal component.

Figure 5A:
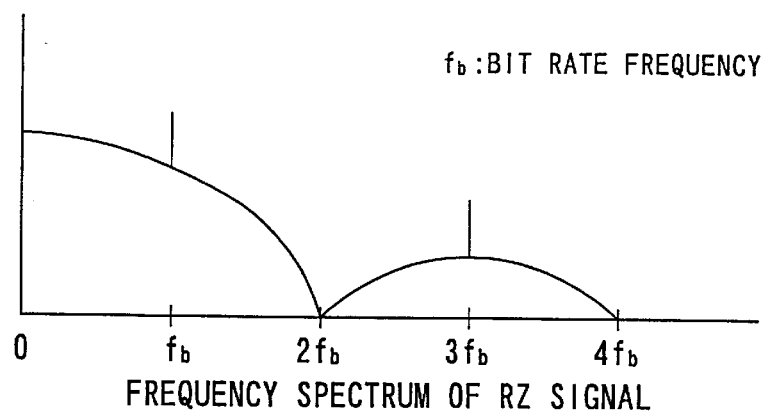
FIG. 5A is an illustration of an example of a frequency spectrum of an RZ signal.

Therefore, in this embodiment, an RZ (Return to Zero) in which the mark rate for the scrambler processing is set at ½ is used as the data signal to be inputted to the aforesaid external modulator 15. As FIG. 5A shows, the RZ signal has a constant quantity of line spectrum fb corresponding to a data signal level at a frequency developing an fb code transmission rate, and this line spectrum fb attenuates in conjunction with the attenuation of a received signal forming transmitted data, which satisfies the foregoing conditions. Accordingly, if the amplitude of this line spectrum fb is detected on the reception side to control the amplitude of the received signal as will be mentioned later, then it is possible to realize the amplitude control of a signal unaffected by a noise.

The wavelength multiplexing section 22 of the optical transmitting apparatus 31 is for wavelength-multiplexing the optical signals from the aforesaid optical transmitters 21-i to output a wavelength-multiplexed optical signal (WDM signal) to the optical transmission line 33.

On the other hand, in the optical receiving apparatus 32, the wavelength demultiplexing section 23 is for demultiplexing a WDM signal from the optical transmission line 33 according to wavelength λi into optical signals. Each of the optical receivers 24-i is for receiving the corresponding one of the optical signals obtained by the demultiplexing according to wavelength λi in the wavelength demultiplexing section 23. In this embodiment, a band-pass filter (first filter) 4 of a clock extracting circuit 18 extracts (detects) the aforesaid line spectrum fb (clock component) from the output (data signal) of a preamplifier 2', and an amplitude detecting circuit (first amplitude detecting circuit) 12 detects amplitude information (peak value) on the line spectrum fb, with an output level (gain) of an optical amplifier 11 serving as an amplitude adjusting means being feedback-controlled on the basis of a result of the detection.

That is, in this embodiment, the clock extracting circuit 18 and the amplitude detecting circuit 12 function as a control means to control the output level of the optical amplifier 11 on the basis of the amplitude of the line spectrum fb extracted by the band-pass filter 4 to keep constant the amplitude of the data signal to be inputted to the signal identifying section 9.

A description will be given hereinbelow of an operation of the optical transmission system thus arranged according to this embodiment. First of all, in the optical transmitting apparatus 31 (which sometimes will be referred to hereinafter as a "transmission side 31"), each of the optical transmitters 21-i modulates light (wavelength λi) from an LD 14 with an RZ signal (data signal) in an external modulator 15. This RZ signal is a signal scrambler-processed so that the mark rate is set at ½.

Incidentally, as the data signal modulation method, it is also acceptable to employ VSB (Vertical Side-Band Modulation), CS-RZ (Carrier Suppressed Return to Zero) modulation, or the like. The CS-RZ modulation method is a technique for inverting (antiphase) an optical carrier phase between adjacent pulses of an optical signal pulse string, and is capable of suppressing a high-level optical carrier frequency component appearing in an RZ signal or NRZ (Non-Return-to-Zero) signal and of generating a pulse signal in which the occupied wavelength band is suppressed to approximately ½. Accordingly, employment of these modulation methods enables increasing the number of wavelengths to be multiplexed.

The optical signals modulated in the external modulators 15 of the optical transmitters 21-i as mentioned above are wavelength-multiplexed in the wavelength multiplexing section 22 and outputted as a WDM signal to the optical transmission line 23 to be transmitted to the optical receiving apparatus 32.

In the optical receiving apparatus 32 (which sometimes will be referred to hereinafter as a "reception side 32"), the wavelength demultiplexing section 23 demultiplexes the WDM signal from the optical transmission line 33 according to wavelength λi into optical signals which in turn, are inputted to the corresponding optical receivers 24-i. In each of the optical receivers 24-i, a light-receiving device 1 receives the inputted optical signal and converts it into an electric signal which in turn, is inputted to a preamplifier 2'.

The preamplifier 2' amplifiers the electric signal from the light-receiving device 1. The output signal of the preamplifier 2' is inputted to a low-pass filter 3 and further to the band-pass filter 4 of the clock extracting circuit 18. In the clock extracting circuit 18, the band-pass filter 4 fetches the aforesaid line spectrum fb, thereby removing noise components.

The output (line spectrum fb) of the band-pass filter 4 is inputted to a limiter amplifier 8. The limiter amplifier 8 cuts off the peak level and bottom level of the output of the band-pass filter 4 and amplifies the received signal so that its upper and lower limits assume predetermined values, thereby generating a clock signal. That is, the limiter amplifier 8 functions as a clock generating section to shape the waveform of the output of the band-pass filter 4 for generating a clock for the signal identifying section 9.

The clock signal thus formed in the limiter amplifier 8 is inputted to a flip-flop circuit 6 of the signal identifying section 9. The flip-flop circuit 6 punches the output of a differential amplifier 5 with the output of the limiter amplifier 8 to output data undergoing signal identification.

On the other hand, the amplitude detecting circuit 12 detects the amplitude value of the clock signal [line spectrum fb (predetermined frequency)] from the output signal of the band-pass filter 4 to output a signal corresponding to that amplitude value as a control signal for controlling the output level (amplification degree) of the optical amplifier 11. To this end, the amplitude of the received data signal to be inputted to the signal identifying section 9 is maintainable constant irrespective of noise, and the optical receivers 24-i work well even if the received signal is in a poor S/N condition.

(A1) Example of Realization of Optical Receivers 24-i

Figure 2:
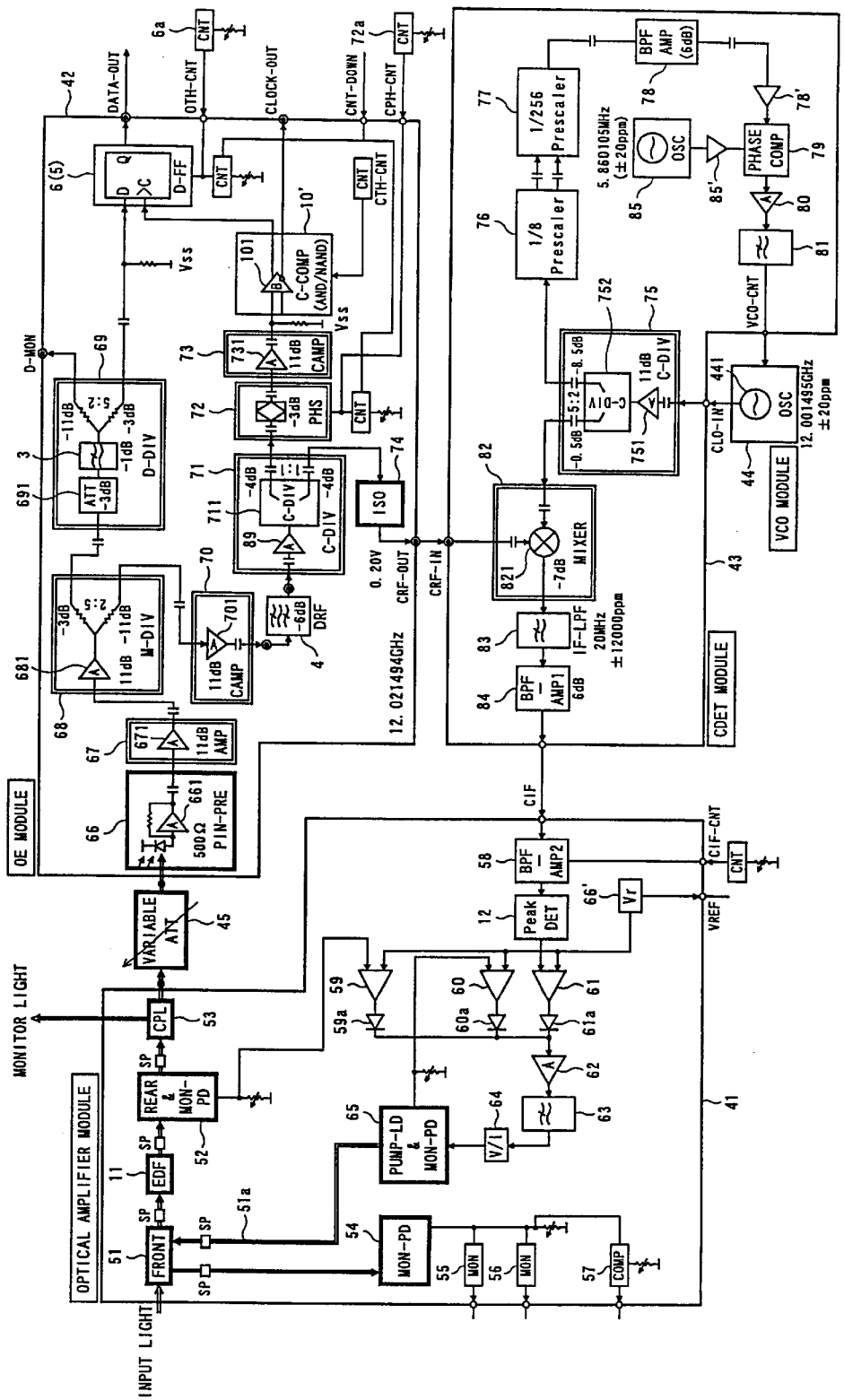
FIG. 2 is a block diagram showing a concrete feasible example of the optical receiver shown in FIG. 1.

FIG. 2 is an illustration of an example of realization of the above-mentioned optical receiver 24-i. In the optical receiver 24-i shown in FIG. 2, numeral 41 designates a an optical amplifier module, numeral 42 designates an OE module (in this case, the operating frequency is set at 12.021494 GHz), numeral 43 denotes a CDET (Clock DETection) module, numeral 44 denotes a VCO (Voltage Controlled Oscillator) module, numeral 45 signifies an optical variable attenuator for adjusting the optical input level to the OE module 42. The attenuation degree of this optical variable attenuator 45 is fixed in operation. In FIG. 2, the same reference numerals as those in FIG. 1 represent the parts corresponding to those mentioned above with reference to FIG. 1.

That is, the optical amplifier module 41 includes an EDF (Erbium Doped Fiber) amplifier (which sometimes will be referred to hereinafter as an "EDF 11") as the aforesaid optical amplifier 11. In the optical amplifier module 41, numeral 51 depicts an optical coupler which is for fetching a portion of inputted light to output it to a monitor PD 54 and further for inputting excitation light from an excitation laser/monitor PD module 65 to the EDF 11, and numeral 52 depicts an optical monitor circuit having a PD to monitor the optical output level of the EDF 11.

In addition, numeral 53 represents an optical coupler for providing a portion (monitor light) of the output light of the EDF 11 to the external. This optical coupler 53 is omissible if the external monitoring is unnecessary. Numeral 54 represents a monitor PD for receiving the input light (monitor light) from the optical coupler 51 to convert it into an electric signal, with the output of this monitor PD 54 being sent through monitor circuits 55, 56 and a comparator 57 to the external to be used as a monitor output and an alarm output (in a case in which no input light exists) with respect to the optical input level.

Still additionally, numeral 58 indicates a narrow-band amplifier which is for receiving a clock signal in an intermediate frequency (IF) band acquired in the CDET module 43 to remove undesired components such as noise components and further for amplifying this clock signal up to an appropriate level. As mentioned above, the amplitude value of the clock signal is detected from the output thereof in the amplitude (peak) detecting circuit 12.

Moreover, numerals 59 to 61 indicate differential amplifiers (operational amplifiers). As input, the operational amplifier 59 receives a voltage value (threshold voltage) set by a voltage setting circuit 66' and the output (voltage signal corresponding to the optical output level of the EDF 11) of the optical monitor circuit 52, the operational amplifier 60 receives the threshold voltage and the output (voltage signal corresponding to the excitation light level) of the excitation laser/monitor PD module 65, and the operational amplifier 61 receives the threshold voltage and the output of the amplitude detecting circuit 12.

Still moreover, numerals 59a, 60a and 61a denote (switching) diodes each of which is made to take an H (conducting) state when the output voltage of the corresponding operational amplifier 59, 60 or 61 exceeds a predetermined voltage value. Concretely, the diode 61a takes an H state when the output voltage of the operational amplifier 61 is in an operating range of the excitation laser/monitor PD module 65, while each of the diodes 59a and 59b enters an H state when the output voltage of the corresponding operational amplifier 59 or 60 is out of the operating range of the excitation laser/monitor PD module 65.

Accordingly, for example, in a case in which the optical output level is too high (there is a possibility that the PD 1 breaks down), or in a case in which the excitation light output power of the excitation laser/monitor PD module 65 is too high (abnormality such as disconnection exists in an optical transmission line 51a to the optical coupler 51), the output of the operational amplifier 59 or 60 comes into effect to stop the operation of the excitation laser/monitor PD module 65, and in the normal condition other than these cases, the output of the operational amplifier 61 (i.e., the output of the peak detecting circuit 12) comes into effect and the excitation light output power is adjusted in accordance with the voltage value thereof so that the optical output level of a data signal component from the EDF 11 is made constant as mentioned above.

That is, the operational amplifier 59, the diode 59a, the operational amplifier 60 and the diode 60a function as a protecting circuit for stopping the excitation light output upon the occurrence of abnormality, for example, when the optical output level of the EDF 11 is too high or when the excitation light output power to the EDF 11 is too high. Incidentally, in this example, although the effective excitation light control signal is changed by the setting of the diodes 59a, 60a and 61a, a similar operation is also realizable by changing the threshold voltage to be given from a voltage setting circuit 66' to the operational amplifiers 59 to 61.

Yet moreover, numeral 62 represents an amplifier for amplifying the outputs (excitation light control signal) of the aforesaid diodes 59a, 60a and 61a up to an appropriate level, numeral 63 represents a low-pass filter for removing undesired (noise) components such as harmonic from the excitation light control signal, and numeral 64 represents a voltage/current (V/I) converting circuit for converting the output (voltage signal) of the low-pass filter 63 into a current signal corresponding to the voltage value thereof. The reason for such voltage/current conversion is that the operation of the excitation laser/monitor PD module 65 depends on a current signal.

Furthermore, in the OE module 42, numeral 66 designates a PD-PRE module including the PD 1 and an amplifier 661 for amplifying the output (data signal) of the PD 1. Numeral 67 designates an amplification module including an amplifier 671 for amplifying the output of the PD-PRE module 66. Numeral 68 designates a resistance divider module including an amplifier 681 for amplifying the output of the amplification module 67. The amplifiers 661, 671 and 681 function as the preamplifier 2' shown in FIG. 1.

Numeral 69 denotes a resistance divider module including a variable attenuator (ATT) 691 capable of adjusting the attenuation degree of one output of the resistance divider module (which will hereinafter be referred to simply as a "divider") 68 and the low-pass filter 3. This resistance divider module 69 forms a branch point 2A shown in FIG. 1. Numeral 70 denotes an amplification module including an amplifier 701 for amplifying a branch signal from the divider 68 to compensate for the gain thereof, with the output thereof being inputted to the band-pass filter 4. This amplification module 70 also serves as a means to preventing a signal from being reflected from the band-pass filter 4 side to the divider 68.

Numeral 71 indicates a divider module including a linear amplifier 89 and a clock divider 711, with the clock divider 711 establishing a branch point 2B shown in FIG. 1. Numeral 72 indicates a clock phase adjusting module capable of adjusting (rotating 360°) the phase of one output (clock) of the divider module 71. The phase adjustment in this clock phase adjusting module 72 is under control of a control circuit 72a.

Numeral 73 signifies an amplification module including an amplifier 731 for amplifying the output (clock) of the clock phase adjusting module 72, and numeral 74 signifies an isolator, with the other output (clock) of the divider 71 being fed through the isolator 74 to a mixer module 82 (multiplier 821) in the CDET module 43.

Numeral 10' designates a comparator module including a clock comparator 101, with one output of this clock comparator 101 being given to a clock terminal (C) of the flip-flop circuit 6 and the other output (inverting output) thereof being supplied as a clock for a signal processing circuit (not shown) at the latter stage. That is, this module 10' functions as both a branch point 2C shown in FIG. 1 and the aforesaid limiter amplifier 8.

In addition, in FIG. 2, a reference voltage Vref for the differential amplifier 5 shown in FIG. 1 is fed from the control circuit 6a to the flip-flop circuit 6. That is, in this case, the flip-flop circuit 6 also functions as the above-mentioned differential amplifier 5.

Furthermore, in the CDET module 43, numeral 75 represents a divider module including an amplifier 751 and a clock divider 752. The output (oscillation frequency=12.001495 GHz) of a VCO 441 in the VCO module 44 is amplified by the amplifier 751, and then fed through the clock divider 752 to the mixer module 82 side and further to prescalers 76, 77 sides. The branch clock to the latter side is divided down to ⅛ and 1/256 in prescalers 76 and 77.

Numeral 78 designates a band amplifier for band-amplifying the output (clock after the dividing) of the prescaler 77, and numeral 78' designates an amplifier for amplifying the output of this band amplifier 78. Moreover, numeral 85 designates an oscillator [OSC (oscillation frequency=5.860105 MHz), and numeral 85' designates an amplifier for amplifying the output of this oscillator 85. Still moreover, numeral 79 designates a phase comparator for receiving, as input, the outputs of the amplifiers 78' and 85', i.e., the VCO output and the OSC output, to detect, as a voltage signal, a difference in phase therebetween.

Numeral 80 denotes an amplifier for amplifying the output (voltage signal corresponding to the phase difference detected) of the phase comparator 79, and numeral 81 denotes a low-pass filter (loop filter) for removing noise components such as harmonic components from the output of the amplifier 80. The output of this low-pass filter 81 is given as a voltage control signal to a VCO 441 and the oscillation frequency of the VCO 441 is finally adjusted and locked to make up the above-mentioned phase difference. That is, a loop comprising the VCO module 44 (VCO 441), the divider module 75, the prescalers 76, 77, the phase comparator 79, the low-pass filter 81 and other devices functions as a PLL (Phase Locked Loop) frequency synthesizer.

In the multiplier 821 of the mixer module 82, the output of this PLL frequency synthesizer is multiplied by a clock (12.021494 GHz) extracted by the band-pass filter 4 of the OE module 42, which performs the frequency conversion (down conversion) from a high-frequency clock of 12.021494 GHz into a clock in the IF band.

Such a down conversion of the clock frequency is made because difficulty is encountered in detecting (identifying) the amplitude on as high-frequency clock as 12.021494 GHz in the amplitude detecting circuit 12 of the latter stage. The down conversion provides a clock having a frequency appropriate to the amplitude detection. In addition, in this embodiment, since the down conversion is made using the output of the PLL frequency synthesizer, it is possible to offer a clock having a stable frequency (phase).

Moreover, numeral 83 depicts a low-pass filter for removing noise components such as harmonic components from the clock thus obtained in the mixer module 82, and numeral 84 depicts a band amplifier for amplifying the output of this low-pass filter 83, with the output of this band amplifier 84 being fed through the optical amplifier module 41 (band amplifier 58) to the amplitude detecting circuit 12.

Thus, the excitation light power to be emitted from the excitation laser/monitor PD module 65 is adjustable on the basis of the amplitude value of the clock (different from the amplitude value of the data signal) detected in the amplitude detecting circuit 12 so that the signal component output level of the EDF 11 is controlled to be made constant. In consequence, the amplitude value of the data signal to be inputted to the OE module 42 (the flip-flop circuit 6 constituting the signal identifying section 9) is controlled to be made constant without depending on the detection SIN of the data signal.

(A2) Description of Modification of First Embodiment

Figure 3:
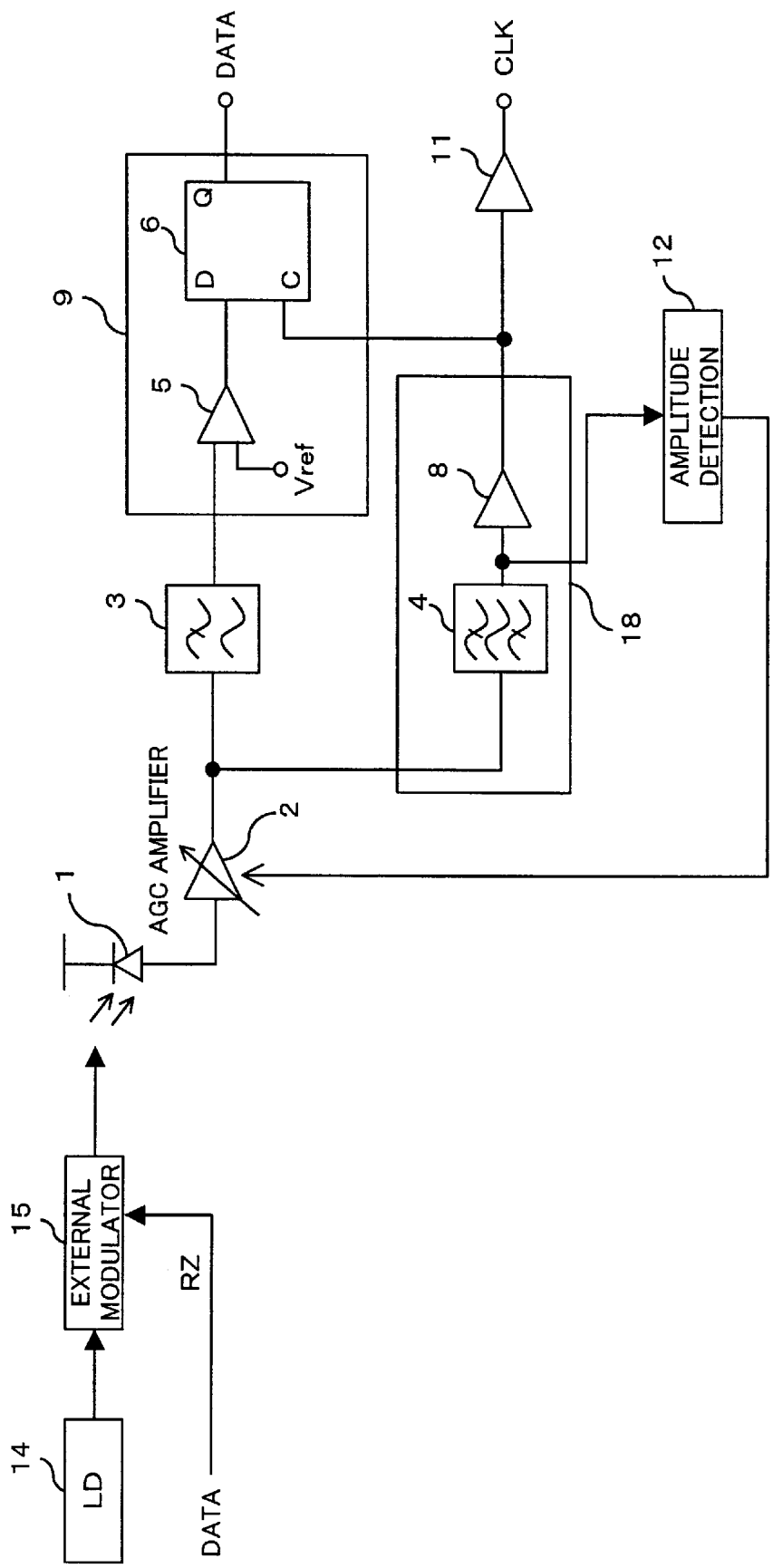
FIG. 3 is a block diagram showing a modification of the first embodiment.

Although, in the above-described first embodiment, the control is implemented on the output level of the optical amplifier 11 (EDF amplifier), even in a manner that the gain of the preamplifier (AGC amplifier) 2 amplifying an electric signal from the PD 1 is feedback-controlled in accordance with a result of the amplitude detection in the amplitude detecting circuit 12, it is also possible to maintain constant the amplitude of a data signal inputted to the signal identifying section 9. FIG. 3 mainly shows a configuration based on an optical transmitter 21-i and an optical receiver 24-i for one channel, where the illustration of a wavelength multiplexing section 22, a wavelength demultiplexing section 23 and others are omitted for brevity.

(B) Description of Second Embodiment

Figure 4:
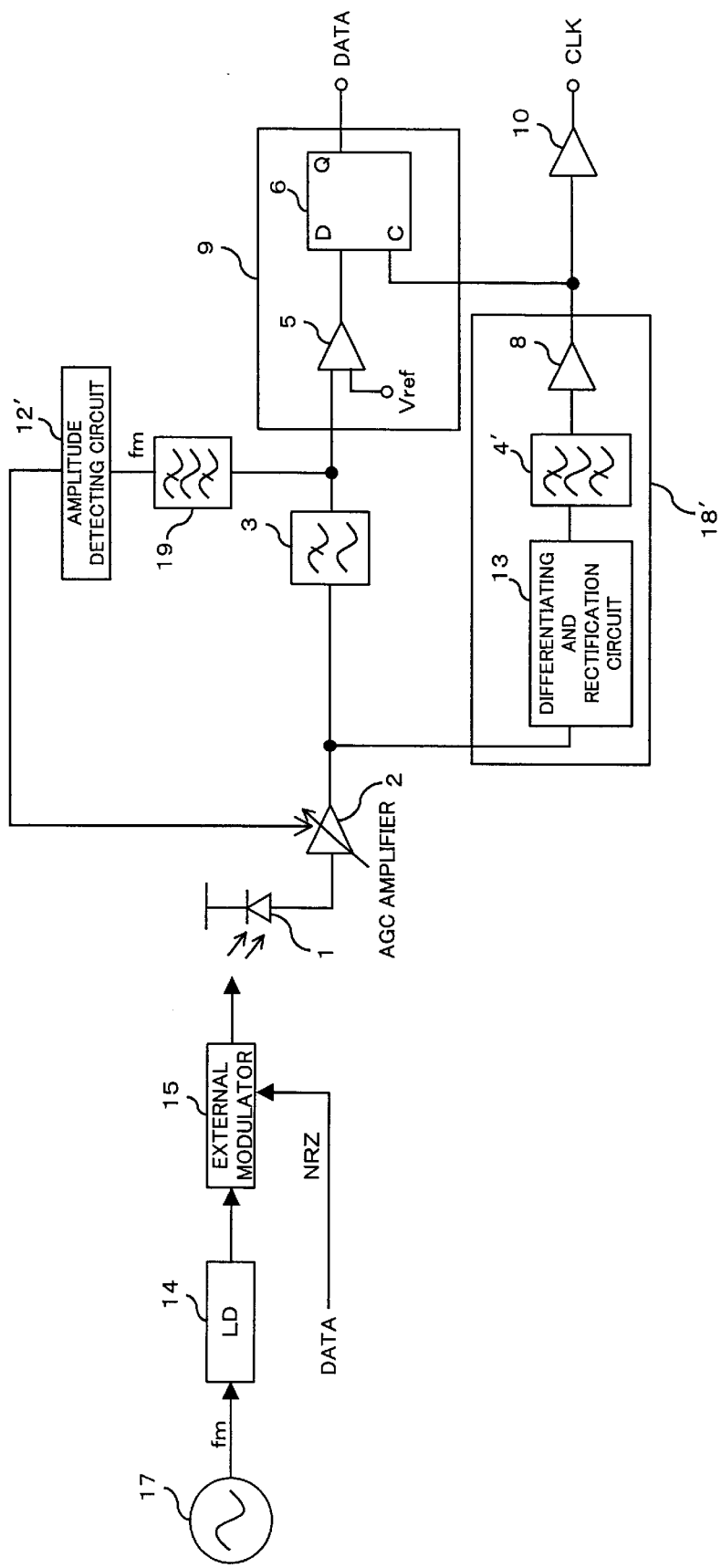
FIG. 4 is a block diagram showing a configuration of an essential part of an optical communication (transmission) system according to a second embodiment of the present invention.
Figure 5B:
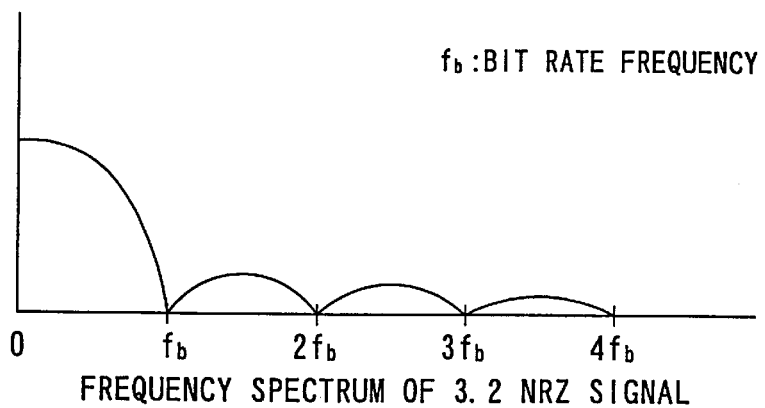
FIGS. 5B and 5C are illustrations of frequency spectrums of NRZ signals.

FIG. 4 is a block diagram showing an configuration of an essential part of an optical communication (transmission) system according to a second embodiment of the present invention. The optical transmission system shown in FIG. 4 involves an arrangement in which the transmission side 31 uses an NRZ signal as a data signal. Unlike the RZ signal, the NRZ signal does not have the line spectrum fb as shown in FIG. 5B, so there is a need to provide a line spectrum by conducting special processing.

Figure 5C:
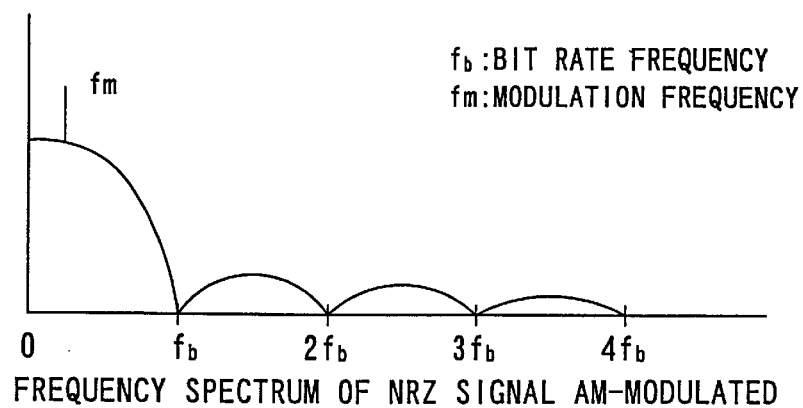

For example, as a method to realize this, it can be considered that sine-wave amplitude modulation is slightly introduced into the "1" side of an optical signal. This provides a sine-wave line spectrum at a frequency fm as shown in FIG. 5C. In this case, the frequency to be used for the amplitude modulation is unrestricted. If the optical transmission line 33 and the optical receiving apparatus 32 (optical receivers 24-i) have a wide band, then it is possible to use a frequency higher than the code transmission rate. On the other hand, in the case of a narrow optical transmission band, the employment of a frequency lower than the code transmission rate becomes advantageous.

For this reason, in the transmission side 31 of this second embodiment, as FIG. 4 shows, a constant-amplitude frequency fm is given to an LD 14 by a frequency oscillator 17 in a state where the LD 14 is in emission so that the amplitude of light continuously emitted from the LD 14 varies a constant quantity (modulation degree of approximately 5%) with a period of 1/fm. In this case, an external modulator 15 is made to modulate, with an NRZ signal, light from the LD 14 thus amplitude-modulated with the frequency fm.

In addition, it is also possible to change the aforesaid modulation degree properly. However, when the modulation degree is made small, the detection S/N becomes poor on the reception side 32, and hence, there is a need to make narrow the band of the band-pass filter 4 accordingly. In addition, the aforesaid modulation frequency fm can be set in common to channels, or it can be changed according to channel. When it is set in common thereto, only one frequency oscillator 17 is required, thus simplifying the apparatus. In the case of the individual installation thereof, an advantage on maintenance is obtainable, such as easy specification of an abnormal channel.

On the other hand, on the reception side 32, a PD 1 receives the light (after wavelength demultiplexing) from the optical transmission line 33, and an AGC amplifier 2 amplifies the output of this PD 1. The output of the preamplifier (AGC amplifier) 2 is inputted to a low-pass filter 3 and to a clock extracting circuit 18'. The low-pass filter 3 is a filter having 3-dB down band corresponding to 0.7 to 0.8 of the bit rate of a received signal. The output of this low-pass filter 3 is inputted to a differential amplifier 5 and to a band-pass filter 19.

The differential amplifier 5 receives, as a reference voltage Vref, a value minimizing the error rate to shape a waveform of a signal from the low-pass filter 3 in an amplitude direction. The band-pass filter (second filter) 19 detects (extracts) a signal component (spectrum) with a frequency fm from the output of the low-pass filter 3. The amplitude value of the signal component with the frequency fm is detected in an amplitude detecting circuit (second amplitude detecting circuit) 12'. The amplitude detecting circuit 12' outputs a signal corresponding to the detected amplitude value as a control signal for adjusting (controlling) the gain of the AGC amplifier 2, thereby keeping constant the signal level to be inputted to the signal identifying section 9 and to the clock extracting circuit 18'.

That is, in this case, a section comprising the band-pass filter 19 and the amplitude detecting circuit 12' functions as a control means to control the output level of the AGC amplifier 2 serving as an amplitude adjusting means capable of the amplitude of a received data signal in accordance with the amplitude of the line spectrum fb extracted by the band-pass filter 19 for maintaining constant the amplitude of the data signal to be inputted to the signal identifying section 9. Incidentally, it is also possible that the input signal to the band-pass filter 19 is obtained from the output of the AGC amplifier 2 (the former stage of the low-pass filter 3).

On the other hand, the clock extracting circuit 18' is composed of a differentiating and rectification circuit 13 including a differentiating circuit for detecting an edge of an input signal (data signal) and a rectifying circuit for rectifying the output of the differentiating circuit, and a band-pass filter 4' and a limiter amplifier 8. The differentiating and rectification circuit 13 generates a signal including a clock component (specific frequency component corresponding to the modulation frequency fm) for the identification of a data signal in the signal identifying section 9.

In addition, a band-pass filter (third filter) 4' extracts the aforesaid clock component from the generated signal and supplies it to the limiter amplifier 8. The limiter amplifier 8 cuts off the peak level and bottom level of the output of the band-pass filter 4 and then amplifies the output thereof so that its upper and lower limits assume a predetermined value, thereby generating a clock.

The clock thus obtained is inputted to the clock terminal (C) of the flip-flop circuit 6 of the signal identifying section 9, and the flip-flop circuit 6 punches the output of the differential amplifier 5 with the output (clock) of the limiter amplifier 8, thereby outputting data undergoing the signal identification.

(C) About Q Value of Band-Pass Filter 4 (4')

For the identification and regeneration of a signal, the control of only the amplitude value of the signal is meaningless, a clock signal is required to have a high SIN ratio. This is because a poor S/N of the clock signal produces an error at the amplitude identification of the clock signal and when the error occurs in the clock signal (which hereinafter will equally be referred to simply as a "clock"), although the synchronization circuit can be released from the out-of-synchronism by re-pulling-into-synchronism, an error rate becomes 0.5 for a forward guard time and for a hunting time to create huge errors. For this reason, even if the received signal shows a poor S/N, there is a need to maintain the S/N of the clock to a good condition (high value). In a case in which a spectrum of a clock signal lies in a received signal, the clock signal requires only a phase component, and for improvement of the S/N of the clock signal, the band of the aforesaid band-pass filter (timing filter) 4 is made narrower until the necessary S/N is reached, thereby reducing noise and offering the necessary S/N.

As an example, in the first embodiment, let it be assumed that an RZ signal with a mark rate of ½ is used as a data signal and a normal operation is conducted at an error rate of $10^{-1}$. A requirement is that the S/N is set for an error rate which may be developed once for one hundred years. Assuming that the mark rate is 100%, a received signal becomes a clock signal. Since the ordinary signal shows a mark rate of 50%, the S/N of the clock is lower by 6 dB than the S/N of the data signal.

For improving the S/N of the clock, a narrow-band band-pass filter 4 is useful. In the case of an error rate of $10^{-1}$, the signal S/N is 8.0 dB, and the clock S/N is 2.0 dB. Assuming that a signal whose bit rate is 10 Gbps (giga bit per second) (this signal will be referred to hereinafter as a "10G signal"), the error rate developed once for one hundred years becomes $3\times10^{-20}$ because one year is approximately $3\times10^9$ seconds and the 10G signal signifies $1\times10^{10}$ bit/second. Accordingly, the clock S/N is set at 25.4 dB.

From the above, the band of the band-pass filter 4 is set to be narrower by 23.4 dB than the noise band (different from the bit rate frequency) of the optical receiving apparatus 32 (optical receivers 24-i). Since the noise band works in an exponent of ½ in the case of S/N, the band is set at 1/220. The Q value of the band-pass filter 4 can be represented as follows when a 3-dB band is taken as $2\Delta\omega$, the bit rate frequency is taken as $\omega_0$ and the optical receiver noise band is taken as $r_c \cdot \omega_0$.

$$\Delta\omega = \omega_0/(2Q)$$

$$Q = \omega_0/(2\Delta\omega) = \omega_0/(\omega_0 \cdot r_c/220)$$

$$= 220/r_c$$

Thus, when $r_c=0.7$, the band-pass filter requires that its Q value is 314 or more. In this connection, the Q value of the band-pass filter 4' can also be obtained through similar calculation. In either case, if the Q value is at least 300 or more, it is possible to provide an optical receiver which works well even if the optical S/N is in an extremely poor condition.

It should be understood that the present invention is not limited to the above-described embodiments, and that it is intended to cover all changes and modifications of the embodiments of the invention herein which do not constitute departures from the spirit and scope of the invention.

What is claimed is:

1. An optical communication system comprising:
   an optical transmitter for transmitting a data signal developing a specific spectrum at a predetermined frequency; and
   an optical receiver for detecting amplitude information on said spectrum included in said data signal transmitted from said optical transmitter to control said data signal to a constant amplitude on the basis of said amplitude information.

2. An optical communication system according to claim 1, wherein said optical receiver includes:
   a signal identifying section for making a signal identification on said data signal;
   amplitude adjusting means for adjusting an amplitude of said data signal to be inputted to said signal identifying section; and
   control means for detecting said amplitude information on said spectrum from said data signal to control said amplitude adjusting means on the basis of said amplitude information so that said amplitude of said data signal to be inputted to said signal identifying section becomes constant.

3. An optical communication system according to claim 2, wherein said amplitude adjusting means is constructed as an optical amplifier for, when receiving said data signal in the form of an optical signal, adjusting an amplification degree of said optical signal, while said control means is designed to control said amplitude of said data signal to be inputted to said signal identifying section by controlling an amplification degree of said optical amplifier.

4. An optical communication system according to claim 3, wherein, for developing said spectrum at said predetermined frequency, said optical transmitter uses an RZ (Return to Zero) signal as said data signal.

5. An optical communication system according to claim 4, wherein said control means of said optical receiver includes:
   a first clock extracting circuit composed of a first filter for extracting a frequency component of said spectrum from said data signal and a clock generating section for waveform-shaping an output of said first filer to generate a clock signal for identification of said data signal in said signal identifying section; and
   a first amplitude detecting circuit for detecting amplitude information on said predetermined frequency to output a signal corresponding to said amplitude information as a control signal for said amplitude adjusting means.

6. An optical communication system according to claim 5, wherein a Q value of said first filter is set at 300 or more.

7. An optical communication system according to claim 3, wherein, for developing said spectrum at said predetermined frequency, said optical transmitter makes an amplitude modulation on an optical signal to be transmitted.

8. An optical communication system according to claim 7, wherein said control means of said optical receiver includes:
   a second filter for extracting a frequency component of said spectrum from said data signal; and
   a second amplitude detecting circuit for detecting amplitude information on said frequency component of said spectrum extracted by said second filter to output a signal corresponding to said amplitude information as a control signal for said amplitude adjusting means.

9. An optical communication system according to claim 8, wherein said optical receiver further includes:
   a differentiating/rectifying circuit composed of a differentiating circuit for detecting an edge of said data signal and a rectifying circuit for rectifying an output of said differentiating circuit; and
   a second clock extracting circuit having a third filter for extracting a clock signal component for identification of said data signal in said signal identifying section from an output of said differentiating/rectifying circuit.

10. An optical communication system according to claim 9, wherein a Q value of said third filter is set at 300 or more.

11. An optical communication system according to claim 2, wherein, for developing said spectrum at said predetermined frequency, said optical transmitter uses an RZ (Return to Zero) signal as said data signal.

12. An optical communication system according to claim 11, wherein said control means of said optical receiver includes:
    a first clock extracting circuit composed of a first filter for extracting a frequency component of said spectrum from said data signal and a clock generating section for waveform-shaping an output of said first filer to generate a clock signal for identification of said data signal in said signal identifying section; and
    a first amplitude detecting circuit for detecting amplitude information on said predetermined frequency to output a signal corresponding to said amplitude information as a control signal for said amplitude adjusting means.

13. An optical communication system according to claim 12, wherein a Q value of said first filter is set at 300 or more.

14. An optical communication system according to claim 2, wherein, for developing said spectrum at said predetermined frequency, said optical transmitter makes an amplitude modulation on an optical signal to be transmitted.

15. An optical communication system according to claim 14, wherein said control means of said optical receiver includes:
    a second filter for extracting a frequency component of said spectrum from said data signal; and
    a second amplitude detecting circuit for detecting amplitude information on said frequency component of said spectrum extracted by said second filter to output a signal corresponding to said amplitude information as a control signal for said amplitude adjusting means.

16. An optical communication system according to claim 15, wherein said optical receiver further includes:
    a differentiating/rectifying circuit composed of a differentiating circuit for detecting an edge of said data signal and a rectifying circuit for rectifying an output of said differentiating circuit; and
    a second clock extracting circuit having a third filter for extracting a clock signal component for identification of said data signal in said signal identifying section from an output of said differentiating/rectifying circuit.

17. An optical communication system according to claim 16, wherein a Q value of said third filter is set at 300 or more.

18. An optical communication system according to claim 1, wherein, for developing said spectrum at said predetermined frequency, said optical transmitter uses an RZ (Return to Zero) signal as said data signal.

19. An optical communication system according to claim 18, wherein said control means of said optical receiver includes:
   a first clock extracting circuit composed of a first filter for extracting a frequency component of said spectrum from said data signal and a clock generating section for waveform-shaping an output of said first filer to generate a clock signal for identification of said data signal in said signal identifying section; and
   a first amplitude detecting circuit for detecting amplitude information on said predetermined frequency to output a signal corresponding to said amplitude information as a control signal for said amplitude adjusting means.

20. An optical communication system according to claim 19, wherein a Q value of said first filter is set at 300 or more.

21. An optical communication system according to claim 1, wherein, for developing said spectrum at said predetermined frequency, said optical transmitter makes an amplitude modulation on an optical signal to be transmitted.

22. An optical communication system according to claim 21, wherein said control means of said optical receiver includes:
   a second filter for extracting a frequency component of said spectrum from said data signal; and
   a second amplitude detecting circuit for detecting amplitude information on said frequency component of said spectrum extracted by said second filter to output a signal corresponding to said amplitude information as a control signal for said amplitude adjusting means.

23. An optical communication system according to claim 22, wherein said optical receiver further includes:
   a differentiating/rectifying circuit composed of a differentiating circuit for detecting an edge of said data signal and a rectifying circuit for rectifying an output of said differentiating circuit; and
   a second clock extracting circuit having a third filter for extracting a clock signal component for identification of said data signal in said signal identifying section from an output of said differentiating/rectifying circuit.

24. An optical communication system according to claim 23, wherein a Q value of said third filter is set at 300 or more.

25. An optical receiver for receiving a data signal transmitted from an optical transmitter which is made to transmit a data signal developing a specific spectrum at a predetermined frequency, said optical receiver comprising:
   a signal identifying section for making a signal identification on said data signal;
   amplitude adjusting means for adjusting an amplitude of said data signal to be inputted to said signal identifying section; and
   control means for detecting amplitude information on said spectrum from said data signal to control said amplitude adjusting means on the basis of said amplitude information so that said amplitude of said data signal to be inputted to said signal identifying section becomes constant.

26. An optical receiver according to claim 25, wherein said amplitude adjusting means is constructed as an optical amplifier for, when receiving said data signal in the form of an optical signal, adjusting an amplification degree of said optical signal, while said control means is designed to control said amplitude of said data signal to be inputted to said signal identifying section by controlling an amplification degree of said optical amplifier.

27. An optical receiver according to claim 26, wherein, for developing said spectrum at said predetermined frequency, said optical transmitter uses an RZ (Return to Zero) signal as said data signal.

28. An optical receiver according to claim 27, wherein said control means includes:
   a first clock extracting circuit composed of a first filter for extracting a frequency component of said spectrum from said data signal and a clock generating section for waveform-shaping an output of said first filer to generate a clock signal for identification of said data signal in said signal identifying section; and
   a first amplitude detecting circuit for detecting amplitude information on said predetermined frequency to output a signal corresponding to said amplitude information as a control signal for said amplitude adjusting means.

29. An optical receiver according to claim 28, wherein a Q value of said first filter is set at 300 or more.

30. An optical receiver according to claim 26, wherein, for developing said spectrum at said predetermined frequency, said optical transmitter makes an amplitude modulation on an optical signal to be transmitted.

31. An optical receiver according to claim 30, wherein said control means includes:
   a second filter for extracting a frequency component of said spectrum from said data signal; and
   a second amplitude detecting section for detecting amplitude information on said frequency component of said spectrum extracted by said second filter to output a signal corresponding to said amplitude information as a control signal for said amplitude adjusting means.

32. An optical receiver according to claim 31, further comprising:
   a differentiating/rectifying circuit composed of a differentiating circuit for detecting an edge of said data signal and a rectifying circuit for rectifying an output of said differentiating circuit; and
   a second clock extracting circuit having a third filter for extracting a clock signal component for identification of said data signal in said signal identifying section from an output of said differentiating/rectifying circuit.

33. An optical receiver according to claim 32, wherein a Q value of said third filter is set at 300 or more.

34. An optical receiver according to claim 25, wherein, for developing said spectrum at said predetermined frequency, said optical transmitter uses an RZ (Return to Zero) signal as said data signal.

35. An optical receiver according to claim 34, wherein said control means includes:
   a first clock extracting circuit composed of a first filter for extracting a frequency component of said spectrum from said data signal and a clock generating section for waveform-shaping an output of said first filer to generate a clock signal for identification of said data signal in said signal identifying section; and
   a first amplitude detecting section for detecting amplitude information on said predetermined frequency to output a signal corresponding to said amplitude information as a control signal for said amplitude adjusting means.

36. An optical receiver according to claim 35, wherein a Q value of said first filter is set at 300 or more.

37. An optical receiver according to claim 25, wherein, for developing said spectrum at said predetermined frequency, said optical transmitter makes an amplitude modulation on an optical signal to be transmitted.

38. An optical receiver according to claim 37, wherein said control means includes:
   a second filter for extracting a frequency component of said spectrum from said data signal; and a second amplitude detecting section for detecting amplitude information on said frequency component of said spectrum extracted by said second filter to output a signal corresponding to said amplitude information as a control signal for said amplitude adjusting means.

39. An optical receiver according to claim 38, further comprising:

a differentiating/rectifying circuit composed of a differentiating circuit for detecting an edge of said data signal and a rectifying circuit for rectifying an output of said differentiating circuit; and a second clock extracting circuit having a third filter for extracting a clock signal component for identification of said data signal in said signal identifying section from an output of said differentiating/rectifying circuit.

40. An optical receiver according to claim 39, wherein a Q value of said third filter is set at 300 or more.

* * * * *

UNITED STATES PATENT AND TRADEMARK OFFICE
CERTIFICATE OF CORRECTION

PATENT NO.       : 7,095,961 B2                                           Page 1 of 1
APPLICATION NO. : 09/949087
DATED            : August 22, 2006
INVENTOR(S)      : Sadao Ibukuro It is certified that error appears in the above-identified patent and that said Letters Patent is hereby corrected as shown below:

TITLE PAGE, ITEM (56) Column 2 (U.S. Patent Documents), Line 8, change "2004/0175810" to --2004/0175180--.

Signed and Sealed this

Ninth Day of January, 2007

JON W. DUDAS
*Director of the United States Patent and Trademark Office*